United States Patent
Patel et al.

[11] Patent Number: 5,838,864
[45] Date of Patent: Nov. 17, 1998

[54] OPTICAL CABLE HAVING AN IMPROVED STRENGTH SYSTEM

[75] Inventors: Parbhubhai Dahyabhai Patel, Dunwoody; Phillip Maurice Thomas, Suwanee, both of Ga.

[73] Assignee: Lucent Technologies Inc., Murray Hill, N.J.

[21] Appl. No.: 846,719

[22] Filed: Apr. 30, 1997

[51] Int. Cl.⁶ ........................................ G02B 6/44
[52] U.S. Cl. .................................. 385/113; 385/107
[58] Field of Search .............................. 385/100, 102, 385/104, 106, 109, 113, 107

[56] References Cited

U.S. PATENT DOCUMENTS

| | | | |
|---|---|---|---|
| 4,730,894 | 3/1988 | Arroyo | 385/113 |
| 4,765,712 | 8/1988 | Bohannon, Jr. et al. | 385/113 |
| 4,781,433 | 11/1988 | Arroyo et al. | 385/102 |
| 4,818,060 | 4/1989 | Arroyo | 385/103 |
| 4,844,574 | 7/1989 | Kinard et al. | 385/33 |
| 4,867,526 | 9/1989 | Arroyo | 385/107 |
| 4,909,592 | 3/1990 | Arroyo et al. | 385/113 |
| 5,013,127 | 5/1991 | Bernard | 385/107 |
| 5,016,973 | 5/1991 | Hager et al. | 385/102 |
| 5,109,457 | 4/1992 | Panuska et al | 385/102 |
| 5,125,063 | 6/1992 | Panuska et al. | 385/113 |
| 5,131,064 | 7/1992 | Arroyo | 385/102 |
| 5,187,763 | 2/1993 | Tu | 385/100 |
| 5,218,658 | 6/1993 | Macleod | 385/107 |
| 5,410,629 | 4/1995 | Arroyo | 385/109 |

*Primary Examiner*—John D. Lee
*Assistant Examiner*—Ellen E. Kang
*Attorney, Agent, or Firm*—Michael A. Morra

[57] ABSTRACT

An optical cable 10 includes a core tube 120 containing optical fibers 101 that extend along the longitudinal axis 105—105 of the cable, and a plastic jacket 160 that encloses the core tube. The cable has a high tensile stiffness which is provided by load sharing between a pair of rigid strength rods 141, 142 and a flexible strength tape 130. The strength rods are coupled to the plastic jacket so that they receive tensile loads applied to the plastic jacket. The strength rods also have a compressive stiffness for inhibiting contraction of the plastic jacket when it is cooled. The tape is made from an array of flexible strands 131 that are woven into a single unit, which is also coupled to the plastic jacket. The flexible strands are woven in such a manner that they exhibit minimum undulation in the longitudinal direction. More particularly, the percent excess length of the flexible strands ($\epsilon_s$) is less than the percent excess length of the optical fiber ($\epsilon_f$) plus one percent i.e., $\epsilon_s < (\epsilon_f + 1\%)$. Accordingly, when a load is applied to the cable jacket, it is resisted by the strength tape after minimum elongation of the cable. Additionally, the tensile stiffness of the flexible strength tape is greater than the overall tensile stiffness of the rigid strength rods so that the greater portion of an applied tensile load is carried by the strength tape.

26 Claims, 5 Drawing Sheets

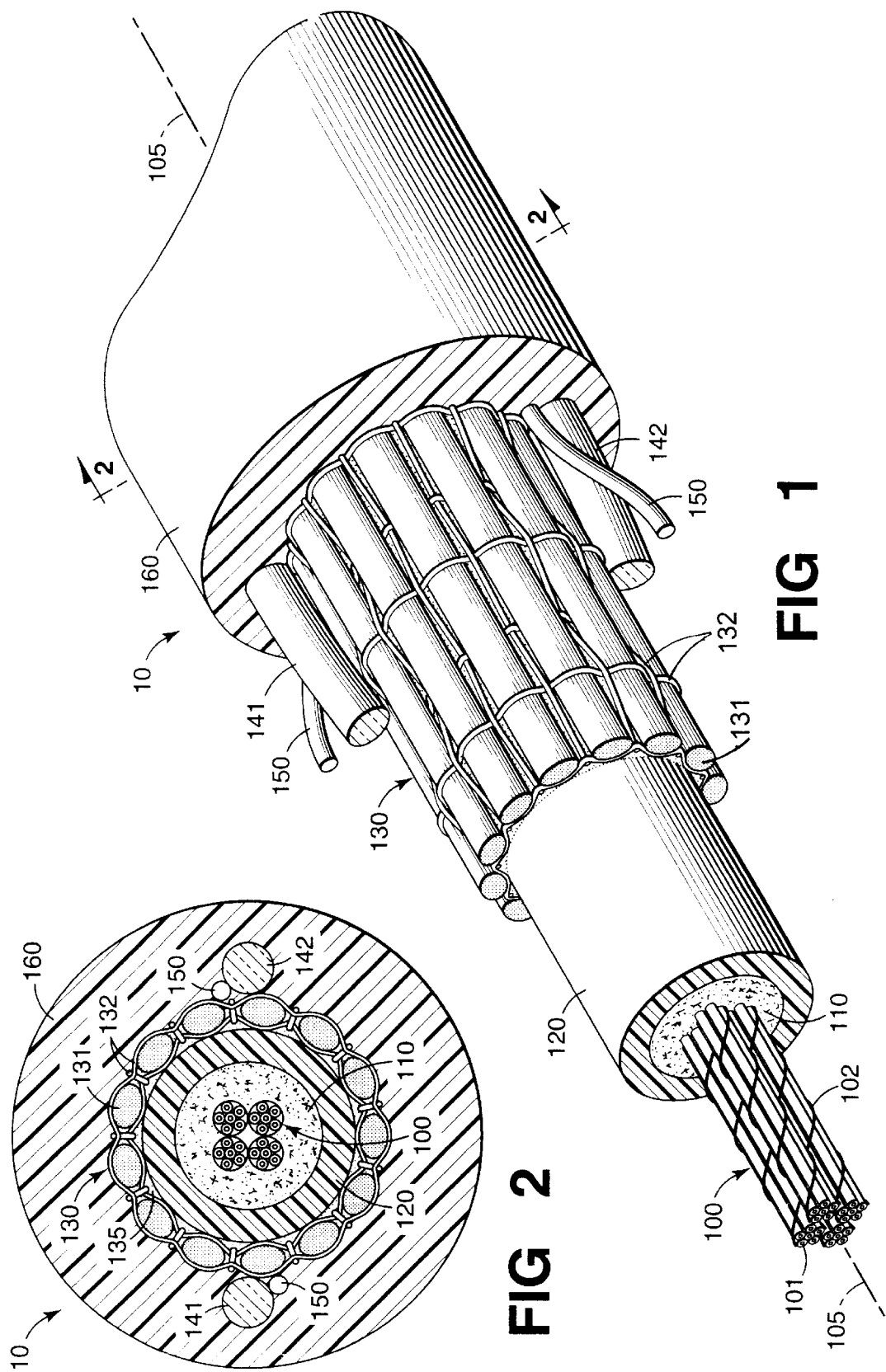

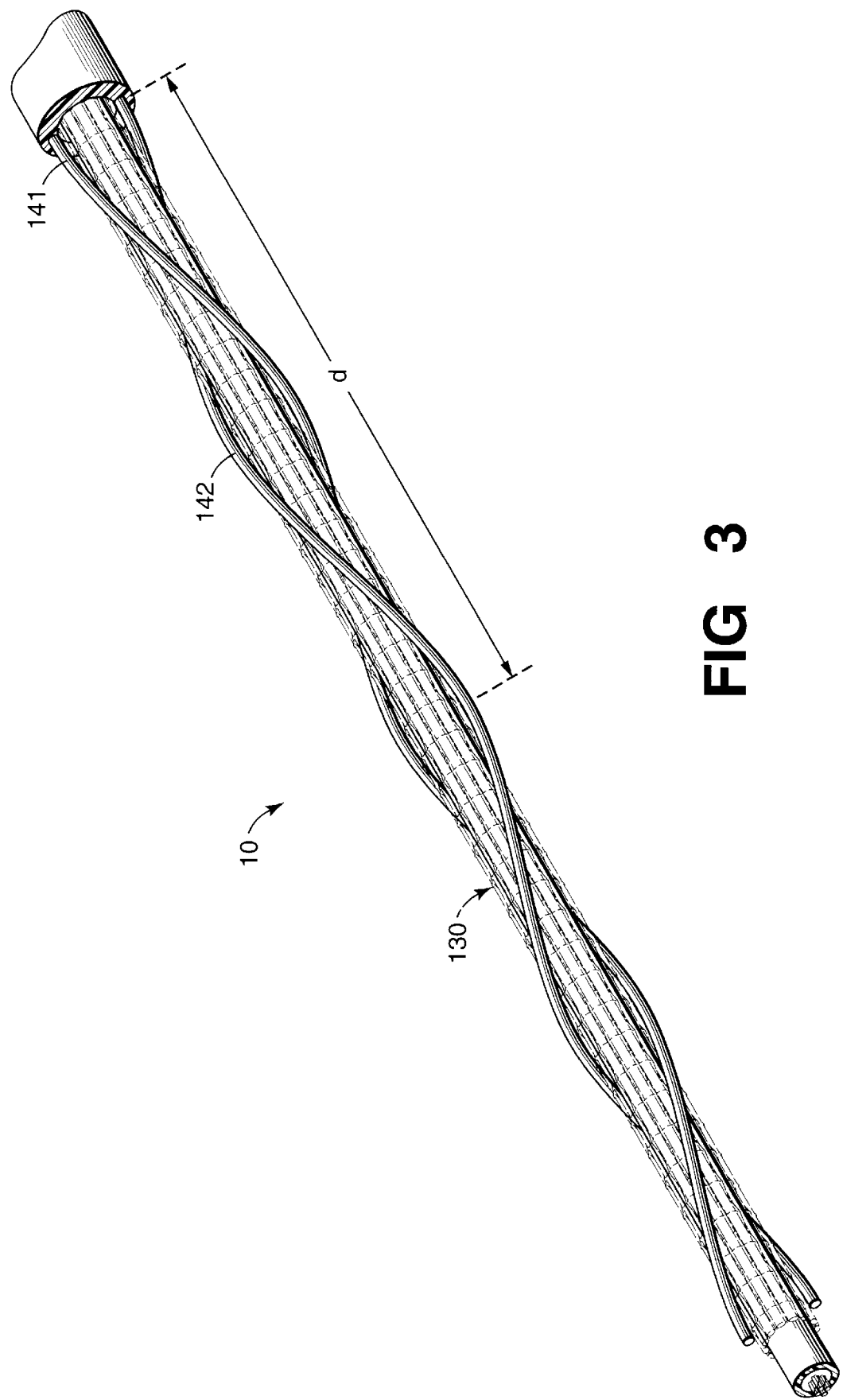

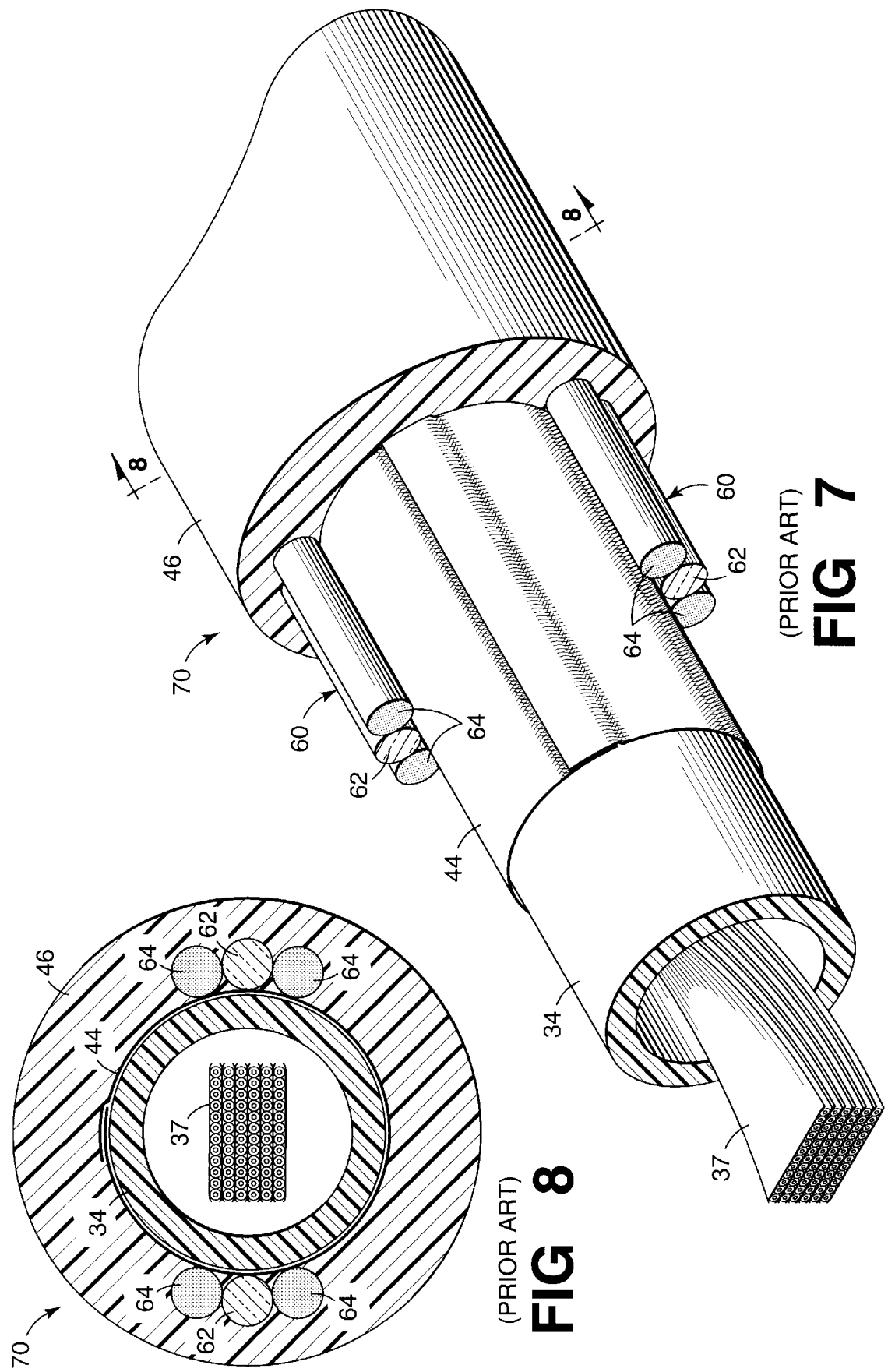

OPTICAL CABLE HAVING AN IMPROVED STRENGTH SYSTEM

TECHNICAL FIELD

This invention relates to an optical cable, and more particularly to a cable having a strength system that includes rigid strength rods and a flexible strength tape.

BACKGROUND OF THE INVENTION

Optical cables use glass fibers as a communications medium rather than metallic conductors; and while glass fibers are relatively strong, care must be taken to avoid excessive tensile stress because they are quite thin and are not ductile. Moreover, the optical transmission characteristics (e.g., index of refraction) of glass change in response to the application of tensile stress. Accordingly, strength members are included in optical cables in order to protect the transmission integrity of the glass fibers contained therein.

Present optical cable structures fall into two major classes: a loose-tube arrangement, and a central core tube arrangement. In the typical loose-tube arrangement, a large number of fibers are packaged into one or more plastic buffer tubes, which are stranded, either helically or with a reversing lay, around a rigid strength member to form a core. In this design, excess fiber length ($\epsilon_f$) is provided by the radial position of the fibers in each buffer tube. And while the loose-tube arrangement is relatively flexible because the rigid strength member resides on the central axis of the cable, it is inherently space inefficient and results in relatively large and heavy cables.

On the other hand, the central core tube arrangement includes a number of fiber bundles or ribbons (stranded or unstranded) that are disposed in a single core tube which extend along the central axis of the cable. Since this arrangement does not include a central strength member, a strength member system is disposed outside the core. Nevertheless, in order to prevent tensile loads, which are applied to the cable, from adversely affecting the glass fibers, the glass fibers are provided with a length that exceeds the length of the completed cable. As a result, the path of the glass fibers either undulate or twist in the longitudinal direction to accommodate their excess length. Excess fiber length ($\epsilon_f$) is generally less than 0.5 percent in order to avoid macrobending and microbending; although the selection of the optimum amount of excess length takes into consideration the tensile strength of the fibers, the tensile and compressive forces that will be applied to the cable over its operating life, and the characteristics of the strength system within the cable.

Heretofore, strength systems used in optical cables have emphasized strength to the exclusion of flexibility. Rigid strength rods, made from steel, epoxy/glass, epoxy/aramid, etc. have been embedded in the cable jacket in such a manner that their overall compressive stiffness has rendered the cable inflexible.

U.S. Pat. No. 5,131,064 discloses a cable having a lightning-protective sheath system comprising a thermal barrier, which is disposed between the core of the cable and its plastic jacket. The thermal barrier comprises a textile of glass yarns that have been woven into a unit and then sandwiched between a pair of tapes together with a waterblocking material such as a superabsorbent powder. The glass yarns undulate in the longitudinal direction (not only because of their weaving pattern, but also because the tape follows the undulations of a corrugated metallic shield), and such undulations preclude the tape from receiving any portion of the load until the cable has already been elongated. And since the disclosed tape has a very low tensile strength (420 Newtons per centimeter of width), the cable's tensile strength effectively comes from rigid strength rods that are embedded in the plastic jacket.

On the other hand, U.S. Pat. No. 4,730,894 discloses an optical fiber cable that includes a plurality of equally spaced strength members disposed on a carrier tape and held in place by an adhesive. Once a plastic jacket is extruded onto the strength members, they are coupled to the jacket and provide tensile strength to the cable. However, if the strength members are flexible (i.e., they have essentially no compressive strength or stiffness), then they will shrink in the longitudinal direction after the plastic jacket cools and will not be able to receive any portion of the tensile load until the jacket is elongated. This is undesirable because excessive cable elongation can cause the tensile load to be transferred to the optical fibers. On the other hand, if the strength members are not flexible, then the cable will not bend easily.

There appears to be a fundamental conflict between the ability to provide a cable that has tensile strength and flexibility. Known designs for providing high tensile strength seem to make the cable stiff and difficult to handle. Known designs for making the cable flexible either require that the glass fibers have more excess length than is desirable, or expose the glass fibers to tensile loading and possible breakage. Accordingly, what is sought is an optical cable with a central core that meets the conflicting demands of high tensile strength and flexibility.

SUMMARY OF THE INVENTION

An optical cable includes a core tube containing optical fibers that extend along the central axis of the cable, and a plastic jacket that encloses the core tube. The cable has a high tensile stiffness which is provided by load sharing between a number of rigid strength rods and a flexible strength tape. The strength rods are coupled to the plastic jacket and receive tensile loads applied to the plastic jacket. The strength rods also have a compressive stiffness that resists contraction of the plastic jacket when it is cooled. The strength tape is made from a longitudinally extending array of substantially straight flexible strands that are prefabricated as a single unit, which is coupled to the plastic jacket. The tensile stiffness of the strength tape exceeds the tensile stiffness of all the strength rods so that the greater portion of an applied tensile load is carried by the strength tape.

In an illustrative embodiment of the invention, the flexible strands of the strength tape are woven in such a manner that they do not undulate in the longitudinal direction. Accordingly, when a tensile load is applied to the cable jacket, the load is transferred to the tape after a minimal elongation of the cable. Additionally, a water-absorbing material is applied to the strength tape that precludes water, which may enter the cable, from spreading along the cable. In a similar vein, a waterblocking material fills the core tube that houses the optical fibers. The waterblocking material has a critical yield stress that allows the fibers to reposition themselves within the core tube without microbending loss when the cable is bent, twisted or pulled. The optical fibers have a small amount (less than 0.5 percent) of excess length to accommodate such cable stresses.

In the illustrative embodiment, a pair of dielectric strength rods are used, and are positioned on diametrically opposite sides of the cable in contact with the strength tape. These rods are positioned in the cable with a reverse-oscillating lay (also known as an "S-Z" twist pattern) so that the cable will be flexible in all directions and will not have a preferred bending plane. The twist pattern reverses direction after approximately every 360 degrees of revolution. Accordingly, an alternating torque is applied to the cable when a tensile load is applied with the result that the net torque is zero. It is recognized that the improved strength system of the present invention can be advantageously used in connection with metallic transmission media as well as glass fibers, and that the strength rods themselves can be metallic.

BRIEF DESCRIPTION OF THE DRAWING

The invention and its mode of operation will be more clearly understood from the following detailed description when read with the appended drawing in which:

FIG. 1 is a perspective view of an optical cable having an improved strength system in accordance with the invention;

FIG. 2 is a cross-section view of the cable of FIG. 1, illustrating some of the elements of the cable in greater detail;

FIG. 3 is a perspective view of a the cable of FIG. 1, illustrating a reverse oscillation twist pattern of the strength rods;

FIG. 7 is a perspective view of a prior-art, optical cable; and

FIG. 8 is a cross-section view of the prior-art cable of FIG. 7.

DETAILED DESCRIPTION

Figure 4:
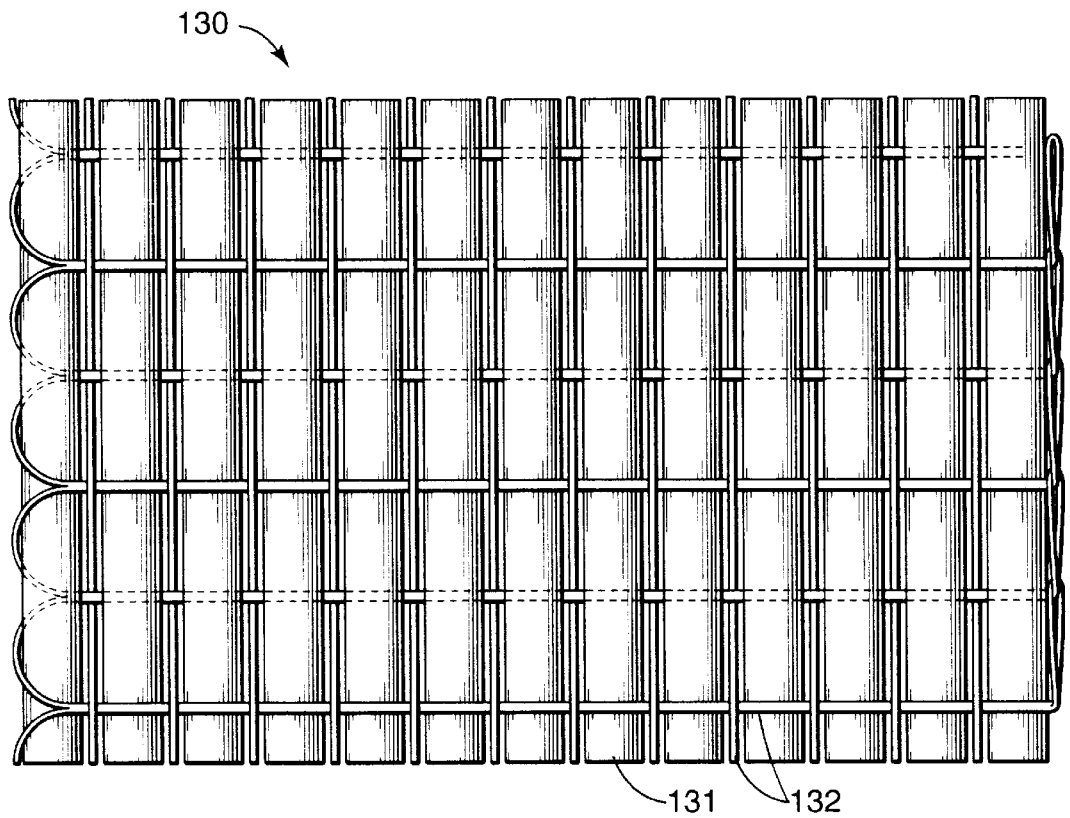
FIG. 4 is a top view of a linear strength tape, which is suitable for use in the present invention, illustrating its weave pattern.

Reference is made to FIGS. 1 and 2 which shows an optical-fiber cable designated generally by the numeral 10. The cable 10 has a core that includes one or more optical fibers 101, which are disposed within a core tube 120 that extends along a longitudinal axis 105—105 of the cable. In a preferred embodiment, a bundle 100 of optical fibers is held together with a binder 102 that is helically wrapped around them. Alternatively, one or more linear arrays of fibers, in the form of ribbons, can be stacked together. Core tube 120 is, illustratively, made of a plastic material such as high-density polyethylene (HDPE), polypropylene, polyvinyl chloride (PVC), polybutylene terephthlate (PBT), or nylon.

The cable of the present invention preferably includes a waterblocking provision, such as filling material 110, which is disposed within the core tube 120 and fills interstices among the bundles 100 and among the fibers 101 within each bundle. The filling material used in this design prevents the migration of water or other liquids along the cable's core. The filling material is such that its rheological properties in the operating temperature range allow easy movement of the fibers when they are strained. This is accomplished by considering the critical yield stress behavior of the filling material. At high temperatures, the filling material should remain in the cable and pass a flow test at 70° C. The material should be non-volatile, non-toxic, and chemically compatible with the optical fibers and other cable components. The filling material should be stable over the service life of the product. A suitable filling material 110 that has been used in the past is a colloidal gel such as disclosed in U.S. Pat. No. 5,187,763 that issued to C. F. Tu on Feb. 16, 1993 and is hereby incorporated by reference. Nevertheless, the present invention does not require the use of filling materials.

Surrounding the core tube 120 is a strength tape 130, which includes a plurality of longitudinally extending strands 131 of a flexible material, such as glass fibers or aramid yarn, that have negligible compressive stiffness when compared to their tensile stiffness. In the preferred embodiment of the invention, the tape is a prefabricated textile—woven from strands of glass fibers that are bound together using a polyester yarn. The weaving pattern (see also FIG. 4) is such that the glass fibers 131, which provide tensile strength, have minimum undulation in the longitudinal direction. This can be accomplished in a number of different ways; however, in the preferred embodiment of the invention, polyester strands 132 are woven in such a manner that they undulate in the longitudinal direction, rather than glass strands 131. Indeed, polyester strands 132 preferably undulate in both the longitudinal (warp) direction and in the transverse (weft) direction. Stated differently, the prefabricated textile includes substantially straight high-tensile-strength strands 131 in the warp direction, and undulating low-tensile-strength strands 132 in the warp and weft directions. Some additional advantages that are associated with the use of a tape structure 130 include: (i) the ability to easily incorporate superabsorbent waterblocking materials 135 into the tape; (ii) mechanical protection for the core tube 120; and (iii) lightning protection for the optical fibers 101.

A pair of rigid strength rods 141, 142 are positioned on diametrically opposite sides of the strength tape 130 that provide compressive and tensile stiffness to the cable as discussed below. A plastic jacket 160, made of high-density polyethylene, for example, is extruded onto the above-described cable components to provide additional strength and protection from the environment. A rip cord 150, made of aramid yarn such as Kevlar® or polyester material, for example, is used to facilitate removal of the plastic jacket.

Strength System

The strength system of the present invention is a 2-part system comprising a strength tape 130 and strength rods 141, 142 that all cooperate to protect the optical fibers 101 within the core tube 120 from excessive tensile stress during handling and service (e.g., in aerial applications). The cable 10 of the present invention is, illustratively, designed to withstand a constant tensile load of 2700 Newtons (600 lb.), and most of the load is carried by the strength tape 130. Ideally, the strength rods should be discarded and the strength tape should carry all of the load. This would yield the lowest-cost, most-flexible, and smallest-diameter cable. However, because the plastic jacket shrinks after being extruded onto the strength system, rigid strength rods are needed to inhibit such shrinkage.

The present invention represents the first recognition that the more expensive strength rods only need to have a minimum size in order to provide compressive stiffness, which is sufficient to inhibit shrinkage of the plastic jacket, and that the tensile stiffness of the strength rods can be augmented by a low-cost strength tape to produce a finished cable having the desired load/strain characteristics. Such load sharing is a departure from known cable designs, and it is the load sharing between rigid strength rods and a flexible strength tape that enables communication cables to be constructed that have high tensile stiffness and flexibility.

And this is achieved without resorting to an expensive helical application of strength members or bulky loose-tube designs.

FIG. 3 discloses the strength system in greater detail and, particularly, the manner in which the strength rods are arranged. In the preferred embodiment of the invention, two strength rods 141, 142 are shown, although different numbers may be used. For example, three or more smaller rods can be evenly spaced around the strength tape 130. Nevertheless, for maximum cable flexibility, the compressive stiffness of the strength rods should only be sufficient to inhibit shrinkage of the plastic jacket. It is noted that steel rods and epoxy-impregnated glass rods have a tensile stiffness which is equal to their compressive stiffness. Accordingly, the strength tape only needs to have a tensile stiffness that is equal to the total desired tensile stiffness of the cable minus the tensile stiffness of the strength rods and minus the tensile stiffness of the other cable components. In general, it is not cost effective to use a strength tape if it does not provide most of the cable's tensile stiffness.

As shown in FIG. 3, strength rods 141, 142 are positioned on opposite sides of strength tape 130 and, preferably, have a reverse oscillating lay (ROL). This is to say that the twist direction of the rods periodically reverses as it helically progresses along the cable. In this illustrative embodiment, the rods change their direction of twist after each revolution, which occurs every distance "d" along the length of the cable 10. In the present invention d≈45–60 cm (i.e., 18–24 inches). The strength rods are twisted to avoid creating a preferred plane of bending, thereby enhancing cable flexibility. The ROL twist pattern is selected because: (1) a unidirectional twist pattern could cause the cable to twist when subjected to tensile loading; and (2) lightweight twisting heads can be used to accomplish ROL twisting. (A well-known advantage of ROL twisting is that it does not require rotation of the spools of material to be twisted.)

In the preferred embodiment of the invention, dielectric strength rods 141, 142 are used that provide both tensile and compressive strength. As discussed above, in order to keep the size of the rods small so that the overall cable can be small and flexible, the compressive stiffness of the rods should only be sufficient to inhibit shrinkage of the plastic jacket. Illustratively, strength rods 141, 142 each have a diameter of about 1.14 mm (0.045 inches) and comprise E-glass fibers that have been impregnated with epoxy for compressive stiffness. Each rod has a tensile stiffness of about 720 Newtons (160 pounds)/percent of extension. Accordingly, for two rods 141, 142, the overall tensile stiffness is about 1440 Newtons/percent of extension. This is to say that the length of the rods will increase by one percent (1%) when a tensile force of 1440 Newtons (320 pounds) is applied. Alternatively, strength rods 141, 142 can be made from steel whose strength is such that its cross-section area is only about ⅓ that of above-described dielectric rods. Accordingly, if an all-dielectric cable is not needed, then a pair of diametrically opposed steel strength rods having a diameter of about 0.66 mm could be used to provide the same compressive stiffness.

An important feature of the present invention is the construction of strength tape 130, which is shown in greater detail in FIG. 4. Tape 130 comprises a linear array of flexible strands 131 having high tensile stiffness, but having little or no compressive stiffness. It is this lack of compressive stiffness that contributes significantly to the desired flexibility of the cable. Flexible strands 131 can be glass or aramid yarns that are prefabricated into a tape before being installed onto the core tube 120 of cable 10 (see FIGS. 1, 2).

Illustratively, the flexible strands 131 are made from Hercuflex™ fiber glass strands, which are commercially sold by PPG Industries, Inc., and are available in several configurations including "HF 4000" which has 4000 filaments per strand. Alternatively, Advantex™ fiber glass strands, which are commercially available from Owens Corning, Inc., are suitable for use as flexible strands 131. In the illustrative embodiment of the invention, thirteen (13) strands of HF 4000 are used, and each strand has a tensile stiffness of about 360 Newtons (80 pounds)/percent of extension. Accordingly, strength tape 130 has a tensile stiffness of about 4680 Newtons/percent of extension. This is to say that the length of tape 130 will increase by one percent when a tensile force of 4680 Newtons (1040 pounds) is applied. In order for the cable 10 to have suitable strength characteristics, the strength system must be coupled to the jacket 160; and in the preferred embodiment of the invention, the strength rods 141, 142 (see FIGS. 1, 2) are embedded in the plastic jacket 160 while the strength tape 130 is partially embedded therein.

It is noted that the strength tape 130 is coupled to the cable jacket such that when a tensile force is applied to the jacket, the force is transferred to the strength tape after minimal elongation of the cable. However, this will only happen when the flexible strands 131 are substantially straight (i.e., they have a limited amount of excess length). If the strength members are woven such that they undulate in the longitudinal direction, such as the case in a common glass fabric, then the length of the cable will have to increase significantly before the strength tape will pick up the load. In the meantime, the tensile force applied to the optical fibers may exceed their safe limit. And while optical fibers may rival the strength of steel for a given cross-section area, they have very small cross sections and are not ductile. It is important that the flexible strands 131 of strength tape 130 be substantially straight so that the optical fibers will not be strained beyond about one percent (1%). Accordingly, the percent excess length of the flexible strands ($\epsilon_s$) should be less than the percent excess length of the optical fibers ($\epsilon_f$) plus about one percent. Mathematically stated: $\epsilon_s < (\epsilon_f + 1\%)$.

Figure 5:
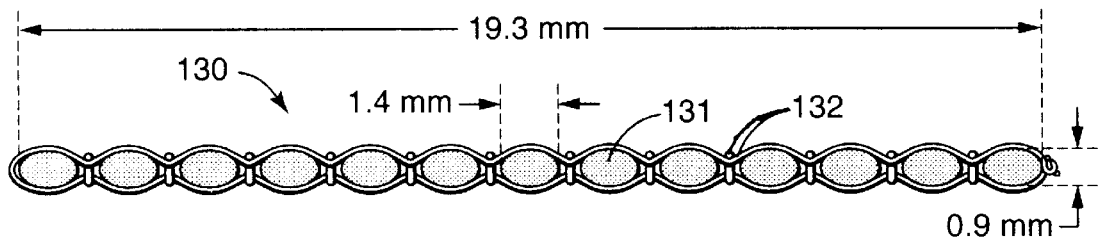
FIG. 5 is an end view of the linear strength tape shown in FIG. 4, illustrating its dimensions.

As also indicated in FIG. 4, the flexible strands 131 are formed into a strength tape by weaving them together with any one of a number of different yarn materials 132. Suitable yarn materials 132 include, but are not limited to, polyester, nylon, cotton and wool. Moreover, yarn material 132 may even include glass strands that have fewer fibers per strand than strand 131. In the preferred embodiment of the invention, yarn material 132 comprises polyester, which is less expensive than many of the other choices. It is noted that the flexible strands 131 can, alternatively, be formed into a tape via adhesives in the manner shown in U.S. Pat. No. 4,730,894 issued to C. J. Arroyo on Mar. 15, 1988. FIG. 5 is an end view of the strength tape 130 showing exemplary dimensions.

In the illustrative embodiment of the present invention, the ratio of the tensile stiffness of the strength tape 130 to the tensile stiffness of the overall strength system is about seventy-five percent (75%). This means that 75% of the tensile load applied to the cable will be carried by the strength tape.

Figure 6:
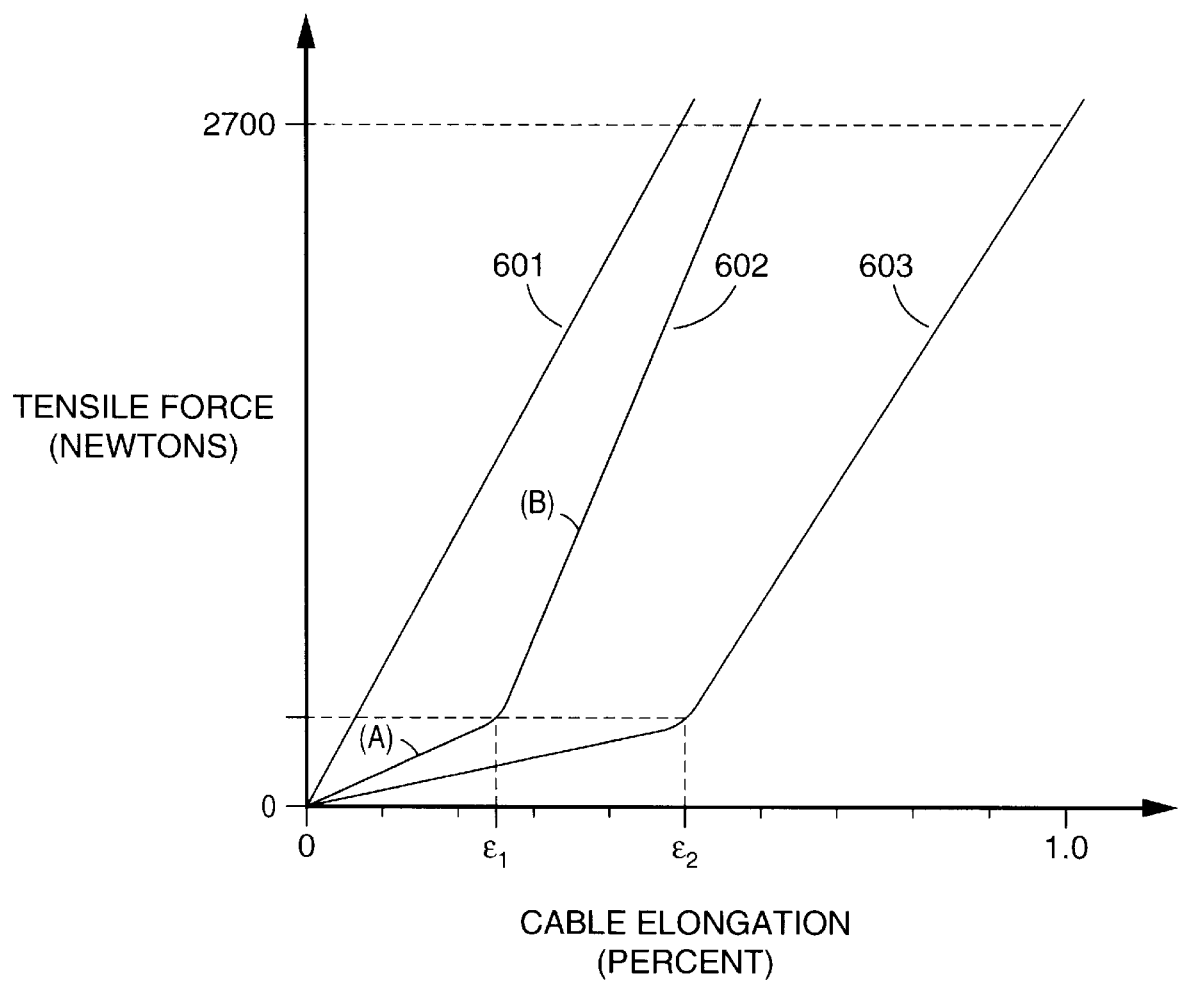
FIG. 6 is a graph showing cable elongation as a function of tensile force for different strength systems.

FIG. 6 is a graph showing cable elongation (i.e., strain) as a function of the tensile force (i.e., stress) applied to the cable for different strength systems. Curve 603 illustrates the situation wherein strength rods 141, 142 are omitted from the cable of FIG. 1, and only a flexible strength tape is used. In this situation, the plastic jacket shrinks after being extruded onto the cable due to cooling. Because the strength tape has little or no compressive stiffness, and because it is coupled to the jacket, the strength tape buckles as the jacket shrinks. Thereafter, when a tensile load is applied to the cable, the strength tape is not available to resist the load until it straightens out. Such a situation is undesirable because the amount of excess fiber length ($\epsilon_f$) needed to avoid tensile loading is such that fiber-bending losses will occur.

The other extreme is shown by curve 601 wherein rigid strength rods are used to handle the entire tensile load. And while rigid strength rods effectively divert tensile loading from the optical fibers, they tend to make the cable less flexible. Accordingly, curve 601 is also undesirable.

Curve 602 graphically illustrates the present invention in terms two different regions of operation. Region (A) shows a rapid increase in cable elongation after a tensile load is first applied and the small undulations in the strength tape are straightening out; whereas region (B) shows a slow increase in cable elongation once the strength tape is handling the majority of the tensile load. The cable rapidly elongates in region (A) because strength rods 141, 142 have been compressed slightly due to shrinkage of the cable's plastic jacket and are elongating slightly as the tensile load is applied. The contribution of the rigid strength rods can be appreciated by comparing region (A) of curve 602 with the corresponding region of curve 603 where no strength rods are used. The difference in cable elongation ($\epsilon_2 - \epsilon_1$) as between curves 602 and 603, at a particular tensile force, is attributable to the fact that the strength rods have resisted cable shrinkage by that amount. Advantageously, this reduces the required amount of excess fiber by a like amount. In the preferred embodiment of the present invention, less than 1.0% excess fiber length is used.

By providing rigid strength rods 141, 142 in combination with a flexible strength tape 130 (see FIGS. 1–2), the plastic jacket will shrink by only a minimal amount, and tensile loads will be quickly applied to the strength tape. It is noted that a cable can be designed to have less than 0.6% elongation at 2700 Newtons of applied tensile force using only strength rods as indicated by curve 601, or by using a combination of rigid strength rods and a flexible strength tape as indicated by curve 602. In accordance with the present invention, the latter provides a less-expensive and more-flexible cable. In the illustrative embodiment of the invention, the strength rods have combined compressive stiffness of about 1440 Newtons/percent of contraction, which effectively inhibits shrinkage of the plastic jacket when it is cooled, and the strength tape has a tensile stiffness of 4680 Newtons/percent of elongation. The overall strength system yields a cable that elongates less than about 0.6% after 2700 Newtons (600 pounds) of tensile force have been applied.

Prior Art

FIGS. 7 and 8 disclose a prior art, optical cable which is disclosed in greater detail in U.S. Pat. No. 5,109,457. Briefly, this cable is generally designated by the numeral 70 and it includes several ribbon arrays 37 of optical fibers within a plastic core tube 34. A water-absorbing tape 44 surrounds the core tube. However, this tape provides little or no linear strength to the cable. Instead, the strength member system 60 comprises two pluralities of strength members which are positioned adjacent to the core tube 34, and in engagement with the tape 44. The two pluralities of strength members are diametrically opposed and extend parallel to the longitudinal axis of the cable 70. All of the strength members 62, 64 comprise a substrate which is made of E-glass fiber filaments. However, the substrate of strength members 62 is impregnated with an epoxy material that causes them to become relatively stiff, and renders them capable of withstanding compressive stresses including those which are induced by thermal cycling and initial shrinkage of the jacket material. It is noted that the strength members 62, 64 have a diameter of about 2.0 millimeters (0.08 inches), which is almost twice the diameter of the rods 141, 142 (see FIG. 2) used in the present invention.

Although various particular embodiments have been shown and described, it is understood that modifications are possible within the spirit and scope of the invention. These modifications include, but are not limited to, the use of an adhesive carrier tape in the prefabrication of the strength tape rather than weaving, the use of metallic conductors as the transmission medium rather than optical fibers, and the use of metallic strength rods rather than dielectric strength rods.

We claim:

1. An optical cable including a core having at least one glass fiber disposed in a core tube that extends along a longitudinal axis of the cable, said cable further including a plastic jacket that encloses the core tube, said cable being characterized by an improved strength system comprising:

a plurality of rigid strength rods that extend in the direction of the longitudinal axis of the cable and are coupled to the cable, said rods having a tensile stiffness for receiving a first portion of a tensile load applied to the cable, and a compressive stiffness that effectively inhibits contraction of the plastic jacket; and a strength tape that extends in the direction of the longitudinal axis of the cable, the tape comprising a linear array of substantially straight flexible strands that are prefabricated as a unit and coupled to the cable, said tape having a tensile stiffness for receiving a second portion of the tensile load applied to the cable, the tensile stiffness of the strength tape exceeding the tensile stiffness of the plurality of strength rods; whereby the greater portion of an applied tensile load is carried by the strength tape.

2. The cable of claim 1 wherein the glass fiber has a length that exceeds the length of the cable by an amount $\epsilon_f$, the flexible strands have a length that exceeds the length of the cable by an amount $\epsilon_s$, and wherein $\epsilon_s < (\epsilon_f + 1\%)$.

3. The cable of claim 1 wherein the plurality of strength rods are made from a dielectric material.

4. The cable of claim 1 wherein the plurality of strength rods comprise a pair of rods that are positioned on opposite sides of the core tube.

5. The cable of claim 1 wherein the plurality of strength rods are disposed adjacent to the strength tape, and progress along the longitudinal direction of the cable with a reverse oscillating lay (ROL) twist pattern.

6. The cable of claim 5 wherein the ROL twist pattern reverses directions after about each 360 degrees of revolution.

7. The cable of claim 1 wherein the flexible strands of the strength tape have negligible compression stiffness in comparison to their tensile stiffness.

8. The cable of claim 1 further including a waterblocking filling material disposed within the core tube.

9. The cable of claim 1 wherein said cable does not have a preferred plane of bending.

10. The cable of claim 1 wherein the strength tape and the plurality of strength rods are at least partially embedded in the plastic jacket.

11. The cable of claim 1 wherein the optical fiber has a length that exceeds the length of the cable, said excess length being less than about 1.0 percent.

12. The cable of claim 1 wherein the flexible strength tape includes a textile of substantially straight high-tensile-stiffness members in the longitudinal direction, and undulating low-tensile-stiffness members in the transverse direction.

13. The cable of claim 12 wherein the flexible strength tape further includes undulating low-tensile-stiffness members in the longitudinal direction.

14. The cable of claim 12 wherein the high-tensile stiffness members comprise bundles of glass fibers.

15. The cable of claim 12 wherein the low-tensile-stiffness members comprise polyester yarn.

16. An all-dielectric optical cable including a core having at least one optical fiber disposed in a core tube that extends along a longitudinal axis of the cable, said cable further including a plastic jacket that encloses the core tube, said cable being characterized by an improved strength system comprising:

a plurality of rigid dielectric strength rods that extend in the direction of the longitudinal axis of the cable and are coupled to the plastic jacket, said rods having a tensile stiffness for receiving tensile loads applied to the plastic jacket, and a compressive stiffness that effectively inhibits contraction of the plastic jacket; and a dielectric strength tape that extends in the direction of the longitudinal axis of the cable, said tape comprising an array of substantially straight flexible strands that are prefabricated into a single unit and are directly coupled to the plastic jacket, said flexible strands having negligible compression stiffness in comparison to their tensile stiffness.

17. The cable of claim 16 wherein the plurality of strength rods comprise a pair of diametrically opposed rods.

18. The cable of claim 17 wherein the plurality of strength rods are disposed adjacent to the strength tape, and progress along the longitudinal direction of the cable with a reverse oscillating lay (ROL) twist pattern.

19. The cable of claim 17 wherein the strength rods are disposed such that the cable does not have a preferred plane of bending.

20. A communications cable, which comprises:

a core comprising at least one transmission medium;

a jacket which comprises a plastic material and which encloses said core;

a prefabricated strength tape comprising a linear array of flexible strands that extend in a longitudinal direction of the cable but do not undulate in said longitudinal direction, the strands being partially embedded in the plastic jacket and having negligible compression stiffness in comparison to their tensile stiffness; and a pair of diametrically opposed rigid strength rods that extend in the longitudinal direction of the cable and are substantially embedded in the plastic jacket, said rods having a tensile stiffness for receiving tensile loads applied to the plastic jacket, and a compressive stiffness that effectively inhibits contraction of the plastic jacket.

21. The cable of claim 20 wherein the transmission medium comprises a glass fiber.

22. The cable of claim 20 wherein the strength tape comprises a textile of glass fibers in the longitudinal direction and non-glass fibers in the transverse direction.

23. The cable of claim 22 wherein the non-glass fibers comprise polyester yarn.

24. An optical cable including a core having at least one glass fiber disposed in a core tube that extends along a longitudinal axis of the cable, the fiber having a length that exceeds the length of the cable by an amount $\epsilon_f$, the cable further including a plastic jacket that encloses the core tube, said cable being characterized by an improved strength system comprising:

a plurality of rigid strength rods that extend in the direction of the longitudinal axis of the cable and are coupled to the cable, said rods having a tensile stiffness for carrying a portion of a tensile load applied to the cable and having a compressive stiffness that effectively inhibits contraction of the plastic jacket; and a strength tape that extends in the direction of the longitudinal axis of the cable, the tape comprising a linear array of flexible strands that are prefabricated as a unit which is coupled to the cable and which has a tensile stiffness that is greater than the tensile stiffness of the strength rods, the flexible strands having a length that exceeds the length of the cable by an amount $\epsilon_s$, wherein $\epsilon_s < (\epsilon_f + 1\%)$.

25. The cable of claim 24 wherein the strength tape comprises a textile of glass fibers in the longitudinal direction and non-glass fibers in the transverse direction.

26. The cable of claim 24 wherein the plurality of strength rods are made from a dielectric material.

* * * * *